(12) United States Patent
Qiang

(10) Patent No.: US 11,182,213 B2
(45) Date of Patent: Nov. 23, 2021

(54) APPLICATION PROGRAM MANAGEMENT METHOD AND DEVICE

(71) Applicant: BANMA ZHIXING NETWORK (HONGKONG) CO., LIMITED, Kowloon (HK)

(72) Inventor: Bo Qiang, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 148 days.

(21) Appl. No.: 16/143,304

(22) Filed: Sep. 26, 2018

(65) Prior Publication Data

US 2019/0095250 A1 Mar. 28, 2019

Related U.S. Application Data

(63) Continuation-in-part of application No. PCT/CN2017/077914, filed on Mar. 23, 2017.

(30) Foreign Application Priority Data

Mar. 31, 2016 (CN) .......................... 201610201932.1

(51) Int. Cl.
*G06F 9/44* (2018.01)
*G06F 9/50* (2006.01)
*G06F 11/34* (2006.01)

(52) U.S. Cl.
CPC .............. *G06F 9/5022* (2013.01); *G06F 9/50* (2013.01); *G06F 9/505* (2013.01); *G06F 11/3433* (2013.01); *G06F 11/3438* (2013.01); *G06F 2201/81* (2013.01); *G06F 2201/865* (2013.01); *Y02D 10/00* (2018.01)

(58) Field of Classification Search
CPC .......... G06F 9/5022; G06F 9/50; G06F 9/505; G06F 11/3433; G06F 11/3438; G06F 2201/81; G06F 2201/865
See application file for complete search history.

(56) References Cited

U.S. PATENT DOCUMENTS

| 5,355,501 A | 10/1994 | Gross | |
| 5,555,399 A * | 9/1996 | Waldron | ............... G06F 12/123 711/133 |
| 8,060,154 B1 | 11/2011 | Bali | |

(Continued)

FOREIGN PATENT DOCUMENTS

| CN | 1996258 A | 7/2007 |
| CN | 101859261 B | 5/2015 |

(Continued)

*Primary Examiner* — Hang Pan
(74) *Attorney, Agent, or Firm* — Van Pelt, Yi & James LLP

(57) ABSTRACT

Managing applications in light of user use habits is disclosed. An indication that an application has been switched from a foreground environment to a background environment is detected. User historical use information associated with the application is accessed. Based at least in part on the user historical use information, it is determined that the application is not likely to be switched to the foreground environment. In response to the determination that the application is not likely to be switched to the foreground environment, one or more resources associated with the application are recycled.

19 Claims, 6 Drawing Sheets

(56) References Cited

U.S. PATENT DOCUMENTS

| | | | | |
|---|---|---|---|---|
| 8,667,500 | B1* | 3/2014 | Ji | G06F 9/5077 718/102 |
| 2009/0158212 | A1* | 6/2009 | Dykstra-Erickson | G06F 3/0482 715/811 |
| 2012/0102504 | A1* | 4/2012 | Iyer | G06Q 10/00 719/318 |
| 2012/0210321 | A1* | 8/2012 | Silva | H04W 4/50 718/100 |
| 2012/0258722 | A1* | 10/2012 | Liu | G06F 9/5022 455/450 |
| 2012/0324481 | A1* | 12/2012 | Xia | G06F 9/485 719/320 |
| 2013/0325856 | A1* | 12/2013 | Soto Matamala | G06F 16/29 707/724 |
| 2014/0082383 | A1 | 3/2014 | De Cesare | |
| 2015/0058867 | A1* | 2/2015 | Zhou | G06F 9/5022 719/312 |
| 2016/0054862 | A1* | 2/2016 | Reeves | G09G 5/14 715/767 |

FOREIGN PATENT DOCUMENTS

| | | |
|---|---|---|
| CN | 103631661 B | 4/2017 |
| CN | 104317673 B | 12/2017 |
| CN | 104239225 B | 2/2018 |

\* cited by examiner

APPLICATION PROGRAM MANAGEMENT METHOD AND DEVICE

CROSS REFERENCE TO OTHER APPLICATIONS

This application is a continuation-in-part of and claims priority to International (PCT) Application No. PCT/CN2017/77914 entitled APPLICATION PROGRAM MANAGEMENT METHOD AND DEVICE filed Mar. 23, 2017 which is incorporated herein by reference in its entirety for all purposes, which claims priority to China Patent Application No. 201610201932.1 entitled AN APP MANAGEMENT METHOD AND MEANS filed on Mar. 31, 2016 which is incorporated by reference in its entirety for all purposes.

FIELD OF THE INVENTION

The present application relates to the field of smart devices. In particular, it relates to techniques for managing smart device applications.

BACKGROUND OF THE INVENTION

Smart operating systems, which include mobile operating systems, are operating systems for mobile phones, such as smartphones, tablets, smartwatches, and other smart devices. Smart operating systems support many of the same features traditionally supported by personal computer operating systems. In addition, smart operating systems support many features (and applications associated with these features) that are considered more essential for smart or mobile devices. Examples of these features include touchscreen interfaces, global positioning system (GPS) localization and navigation, cellular capability, and video/picture cameras. Mainstream smart operating systems often have many applications running concurrently. For example, an application that a user is actively using may be presented in a foreground environment, and other applications may be running in a background environment. When many applications run concurrently, system resources may become insufficient to allow for satisfactory operation of all of the applications that are running. When system resources are insufficient, currently running applications can be managed to address the system resource insufficiency. Managing system resources oftentimes requires a triggering event of some kind, such as a user-initiated request. However, if a smart operating system has been in a locked state for an extended period of time (e.g., the user has been sleeping), some applications that have been recently opened would remain unused and resources associated with those applications might not be recycled. In other situations, some applications whose resources have just been recycled might become actively used again by the user shortly after the resources have been recycled. Therefore, there exists a need for a way to more efficiently manage smart operating system applications and the resources associated with those applications.

BRIEF DESCRIPTION OF THE DRAWINGS

Various embodiments of the invention are disclosed in the following detailed description and the accompanying drawings.

DETAILED DESCRIPTION

Figure 1:
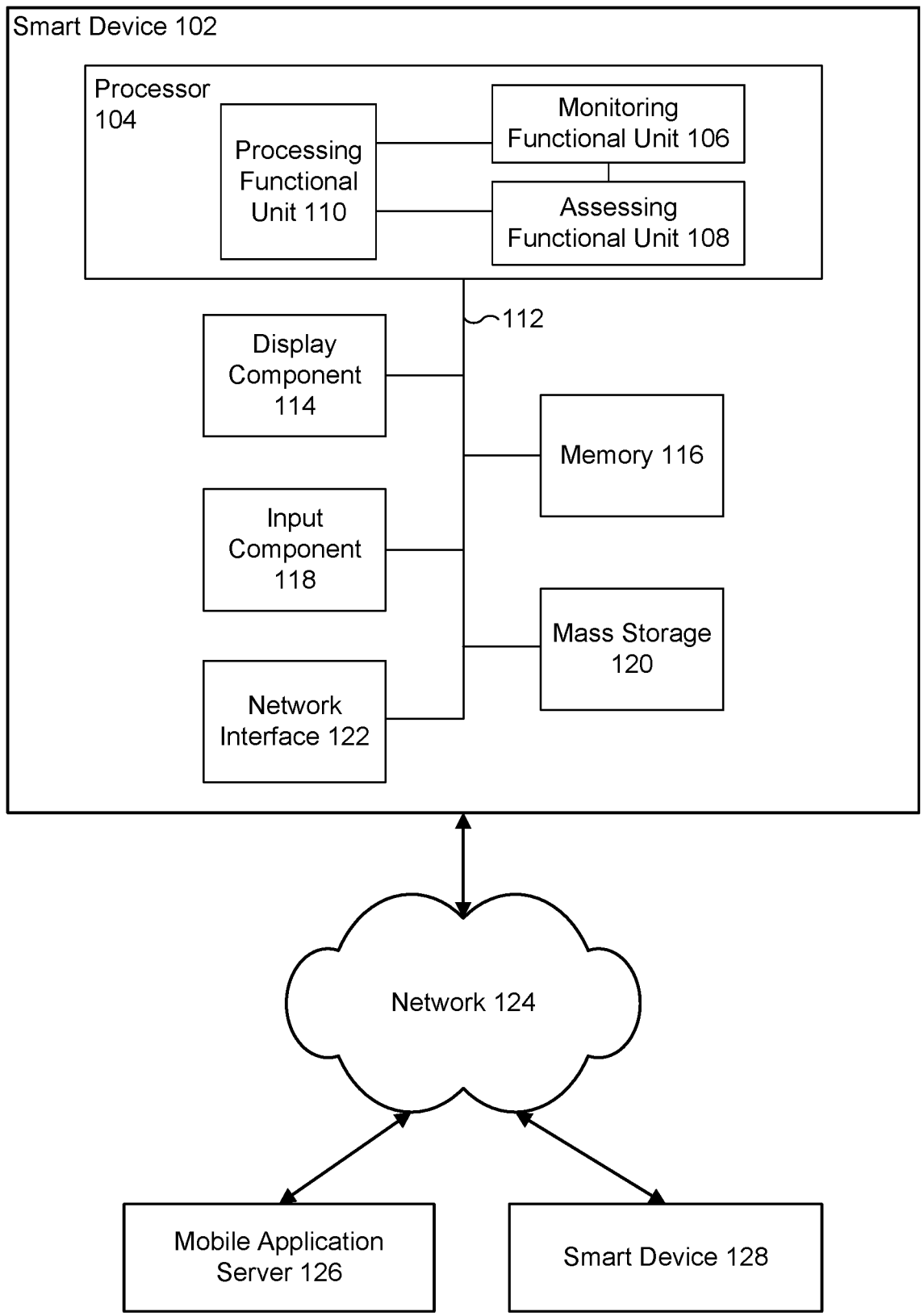
FIG. 1 is a block diagram illustrating an embodiment of a system for managing applications in light of user use habits.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of managing applications in light of user use habits are described herein. Examples of applications include mobile apps (such as smartphone apps, tablet apps, and smartwatch apps) and any other software programs used to browse the Internet, access media, communicate with others, play games, operate a camera, conduct financial transactions, conduct social media activities, manage other software, process data, access and/or manage other data and/or services, and perform any other function. An indication that an application has been switched to a background environment (which may also be referred to herein as "the background") is detected. User historical use information associated with the application is accessed. In some embodiments, examples of user historical use information include locations where an application is launched, closed, switched to a foreground environment (which may also be referred to herein as "the foreground"), or switched to a background environment; start/end times (and thus duration) of an application being in a foreground environment; start/end times (and thus duration) of an application being in a background environment; start/end times (and thus duration) of an application not being in either a foreground environment or a background environment; and any other information relating to user historical use habits. In some embodiments, the location information that is accessed is a GPS location with a specified precision or a user-defined location, e.g., home, office, and so forth. Based at least in part on the user historical use information, it is determined that the application is not likely to be switched from the background to the foreground. In response to the determination that the application is not likely to be switched to the foreground, resources associated with the application are recycled. Examples of recycling resources associated with an application include overwriting that application's data in memory with data associated with a different application; allocating CPU time associated with that application to a different application; and/or allocating network bandwidth associated with that application to a different application. In various embodiments, recycling resources associated with an application does not require closing the application. Closing an application typically allows all of the resources associated with the application to be reclaimed by an operating system. In various embodiments, recycling resources associated with an application instead of closing the application reduces the time it takes the application to load for a user when the user requests use of the application at a later time. For example, allocating a first application's CPU time to a second application instead of closing the first application may allow for the first application to be loaded more quickly when it is requested again.

In some embodiments, when an application on a smart device is launched, the smart device records smart device location and/or time information at the time the application is launched. This information is foreground status information (because the application is launched into the foreground). After the smart device accumulates more than one piece of foreground status information for a given application, a set of foreground status information may be constructed for that application. Generally, an application is in the foreground when it is launched, and typically only one application can be in the foreground at a time. Other applications may have to be switched to the background after a new application is launched. After an application on a smart device is switched to the background, the smart device may record smart device location and/or time information at the time the application was switched to the background. This information is background status information. After the smart device accumulates more than one piece of background status information for a given application, a set of background status information may be constructed for that application. In some embodiments, the set of foreground status information and the set of background status information for a given application may be recorded together. In some embodiments, the set of foreground status information and the set of background status information may be further subdivided according to time period (based on the principle that user use habits may vary during different time periods). For example, for work days, separate sets of foreground status information and background status information may be recorded in a work day data structure (e.g., a list, a table, etc.), and for non-work days, corresponding sets may be recorded in a non-work day list data structure (e.g., a list, a table, etc.). As another example, the set of foreground status information and the set of background status information for an application may be subdivided into separate first quarter, second quarter, third quarter, and fourth quarter subsets corresponding to annual or fiscal quarters.

In various embodiments, it is possible to classify and record foreground status information and background status information generated from user historical use information. For example, when a user launches applications and the applications are switched to the background during different time periods, user historical use information such as smart device location and time may be classified and collected to obtain comprehensive knowledge of user use habits. It is possible to record a set of foreground status information and a set of background status information for each application, and it is possible to record each start time of each application so that each application can be managed rationally in light of user use habits. In some embodiments, a duration for each foreground episode (e.g., start time and end time) for an application and/or each time at which the application switches to the background, may be recorded. In some embodiments, a duration for each background episode (e.g., start and end time) for the application and/or each time at which the application recycles resources associated with that application may be recorded. A location for the smart device may be recorded each time an application is launched, closed, and/or switches from the foreground to the background or vice versa. A smart device generally has multiple applications running concurrently. The smart device may record a set of foreground status information and a set of background status information corresponding to each application. An application's set of foreground status information and set of background status information may be included in that application's user historical use information. To facilitate description of the various embodiments, the example of a smart device managing one application will be used in various examples. A smart device may use the same or a similar management approach for each application, and management of different applications may be in parallel.

A benefit of the present application is the rational management of applications in light of user use habits. It would be beneficial to recycle resources associated with applications that are unlikely to be used in the near term as well as to avoid recycling resources of applications that are likely to be used again in the near term. Not only does this increase user operating efficiency and improve user experience, it also conserves electrical energy and extends battery life. In some embodiments, a smart device may also determine a current idle memory ratio. When the idle memory ratio is low (i.e., idle memory is low), each application may sequentially undergo resource recycling according to a comprehensive status value, as will be described in more detail below. A benefit of sequentially recycling resources according to comprehensive status values is that this will maintain a satisfactory smart device idle memory ratio and improve smart device stability and performance. By using the technical scheme illustrated by various embodiments of the present application, a smart device can perform smarter resource recycling of applications. A technical benefit is that resources do not need to be unnecessarily consumed relaunching applications whose resources are recycled at the appropriate time because the applications are predicted to not be needed again by the user for a period of time. A further technical benefit is that when a smart device is able to recycle resources at an appropriate time, resources are conserved; furthermore, after a certain period of use by the user, operation of the overall smart device will become smoother as the way resources are recycled conforms more and more to user use habits.

FIG. 1 is a block diagram illustrating an embodiment of a system for managing applications in light of user use habits. In the example shown, smart device grouping 102 includes processor grouping 104 (which includes monitoring functional unit 106, assessing functional unit 108, and processing functional unit 110), bus 112, display component 114, memory 116, input component 118, mass storage 120, network interface 122, network 124, mobile application server 126, and smart device 128. Other system architectures and configurations can be used to manage applications in light of user use habits. Smart device 102, which includes various subsystems as described below, includes at least one microprocessor subsystem (also referred to as a processor or a central processing unit (CPU)). For example, processor 104 can be implemented by a single-chip processor or by multiple processors. In some embodiments, processor 104 is a general-purpose digital processor that controls the operation of smart device 102. Using instructions retrieved from memory 116, processor 104 controls the reception and manipulation of input data, and the output and display of data on output devices (e.g., display component 114, which could be a liquid crystal display (LCD) screen, light-emitting diode (LED) screen, or any other display type).

Processor 104 is coupled bi-directionally with memory 116, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 104. Also, as is well known in the art, primary storage typically includes basic operating instructions, program code, data, and objects used by processor 104 to perform its functions (e.g., programmed instructions). For example, memory 116 can include any suitable computer readable storage media, described below, depending on whether, for example, data access needs to be bi-directional or uni-directional. For example, processor 104 can also directly and very rapidly retrieve and store frequently needed data in a cache memory (not shown).

In the example shown, processor 104 includes monitoring functional unit 106, assessing functional unit 108, and processing functional unit 110.

The units can be implemented as software components executing on one or more processors, as hardware such as programmable logic devices, and/or Application Specific Integrated Circuits designed to elements that can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

In various embodiments, monitoring functional unit 106 includes control instructions for detecting through monitoring that an application has been switched to the background. In various embodiments, assessing functional unit 108 includes control instructions for using recorded user historical use information relating to an application as a basis to assess whether the application will continue to be used.

In various embodiments, processing functional unit 110 includes control instructions for recycling resources utilized by an application upon determining that the application will not continue to be used. Examples of resources that may be recycled include memory resources such as cache memory and RAM, access to the CPU, and any other smart device resources. In some embodiments, one or more computer programs embodied on a computer readable storage medium may contain the control instructions used by monitoring functional unit 106, assessing functional unit 108, and processing functional unit 110 within processor 104. In some embodiments, prior to recycling resources utilized by an application, processing functional unit 110 may determine that the application satisfies a resource recycling condition. Processing functional unit 110 may determine that the application satisfies a resource recycling condition upon determining that a runtime status and/or system status of the application satisfies a specified condition. To determine that the runtime status and/or system status of the application satisfies the specified condition, processing functional unit 110 may keep time while the application is switched to the background and determine that the time has reached a limit; or determine that the length of time that resources of the application have been utilized has reached a limit; and/or determine that the idle memory ratio of the smart device is lower than a certain threshold. In some embodiments, processing functional unit 110 includes control instructions for not recycling resources utilized by an application upon determining that the application satisfies a resource recycling condition and determining that the application will continue to be used. In various embodiments, user historical use information includes a set of foreground status information of an application. To use this user historical use information as a basis to assess whether the application will continue to be used, assessing functional unit 108 may include control instructions to determine a current status (e.g., current location and/or current time) for the application, calculate a ratio that characterizes the frequency with which the current status appears in the set of foreground status information for the application, compare the ratio to a threshold, and, based at least in part on the comparison, determine whether the application will continue to be used or not. In various embodiments, the user historical use information includes both a set of foreground status information and a set of background status information for the application (in some embodiments, the user historical use information only includes foreground status information or only includes background status information). To use this user historical use information as a basis to assess whether an application will continue to be used, assessing functional unit 108 may include control instructions to determine a current status information of the application, calculate a ratio that characterizes the frequency with which the current status appears in the set of foreground status information for the application, calculate another ratio that characterizes the frequency with which the current status appears in the set of background status information for the application, create a comprehensive status value that is a linear combination of these ratios, compare the comprehensive status value to a threshold, and, based at least in part on the comparison, determine whether the application will continue to be used or not. In some embodiments, processing functional unit 110 includes control instructions to determine that the current idle memory ratio of the smart device is less than a threshold, separately calculate a comprehensive status value for each application in the background, and sequentially recycle resources of the applications according to an order of comprehensive status values until the current idle memory ratio of the smart device is not less than the threshold.

A technical improvement is (upon detecting through monitoring that an application has been switched to the background) the use of recorded user historical use information associated with the application as a basis to assess whether the application will continue to be used, which allows recycling of resources utilized by the application upon determining that the application will not continue to be used. Thus, management of applications in light of user use habits is performed rationally. Not only does this increase user operating efficiency and improve user experience, it also conserves electrical energy and extends battery life. By considering current user context and user historical habits, various embodiments of the present application improve the way in which applications are managed.

Mass storage 120 provides additional data storage capacity for smart device 102 and is coupled either bi-directionally (read/write) or uni-directionally (read only) to processor 104. For example, mass storage 120 can include computer readable media such as flash memory, portable mass storage devices, and other storage devices. Mass storage 120 can provide additional data storage capacity. The most common example of mass storage 120 is flash memory. Mass storage 120 generally stores additional programming instructions, data, and the like that typically are not in active use by processor 104. It will be appreciated that the information retained within mass storage 120 can be incorporated, if needed, in standard fashion as part of memory 116 (e.g., RAM) as virtual memory.

In addition to providing processor 104 access to storage subsystems, bus 112 can also be used to provide access to other subsystems and devices. As shown, these can include a display component 114, a network interface 122, an input component 118, as well as an auxiliary input/output device interface, speakers, and other subsystems as needed. For example, input component 118 can include a touchscreen, keypad, microphone for recognizing voice commands, and/or any other method for receiving input. Bus 112 within the bus architecture may include any number of interconnected buses and bridges. The bus links together various circuits including one or more processors represented by processor 104 and storage subsystems. The bus may also link together various circuits such as peripheral devices, voltage stabilizers, and power management circuits. Processor 104 is responsible for managing the bus and for general processing, such as running a general operating system. Memory 116 may be used to store data used by processor 104 when executing operations. Depending on the embodiment, processor 104 may be a CPU, an ASIC, an FPGA, a CPLD, or another type of processing component.

Network interface 122 allows processor 104 to be coupled to another smart device, a computer network, and/or a telecommunications network using a network connection as shown. For example, through network interface 122, processor 104 can receive information (e.g., data objects or program instructions) from another network or output information to another network. Information, often represented as a sequence of instructions to be executed on a processor, can be received from and outputted to another network. An interface card or similar device and appropriate software implemented by (e.g., executed/performed on) processor 104 can be used to connect smart device 102 to an external network and transfer data according to standard protocols. In the example shown, portions of the communication path between the components are shown. Other communication paths may exist, and the example of FIG. 1 has been simplified to illustrate the example clearly. In the example shown, network 124 connects smart device 102 to a mobile application server 126 and another smart device 128. Examples of network 124 include one or more of the following: a direct or indirect physical communication connection, mobile communication network, Internet, intranet, Local Area Network, Wide Area Network, Storage Area Network, and any other form of connecting two or more systems, components, or storage devices together. In the example shown, mobile application server 126 communicates with smart device 102 via network 124. Examples of mobile application server 126 include any hardware or software system, component, process, and/or application. Mobile application server 126 may, for example, exchange information with an application running on smart device 102. Examples of another smart device 128 that could communicate with smart device 102 include a smartphone, a tablet, a smartwatch, and any other device. A smartphone, for example, may exchange information with an application running on smart device 102. Mobile application server 126 and/or smart device 128 are typically physically separate systems that are not necessarily located in the same geographic location as smart device 102. Although single instances of components have been shown to simplify the diagram, additional instances of any of the components shown in FIG. 1 may exist. The number of components and the connections shown in FIG. 1 are merely illustrative. For example, additional instances of mobile application server 126 and smart device 128 may exist. Other components not shown may also exist. For example, smart device 102 may connect to other connected devices via network interface 122. Examples of these connected devices include printers, household appliances, and other devices that may not necessarily be classified as smart devices. Additional mass storage devices (not shown) can also be connected to processor 104 through network interface 122. An auxiliary I/O device interface (not shown) can be used in conjunction with smart device 102. The auxiliary I/O device interface can include general and customized interfaces that allow processor 104 to send and, more typically, receive data from other devices such as microphones, touch-sensitive displays, transducer card readers, tape readers, voice or handwriting recognizers, biometrics readers, cameras, portable mass storage devices, and other devices. Other components not shown in FIG. 1 may also exist.

Figure 2:
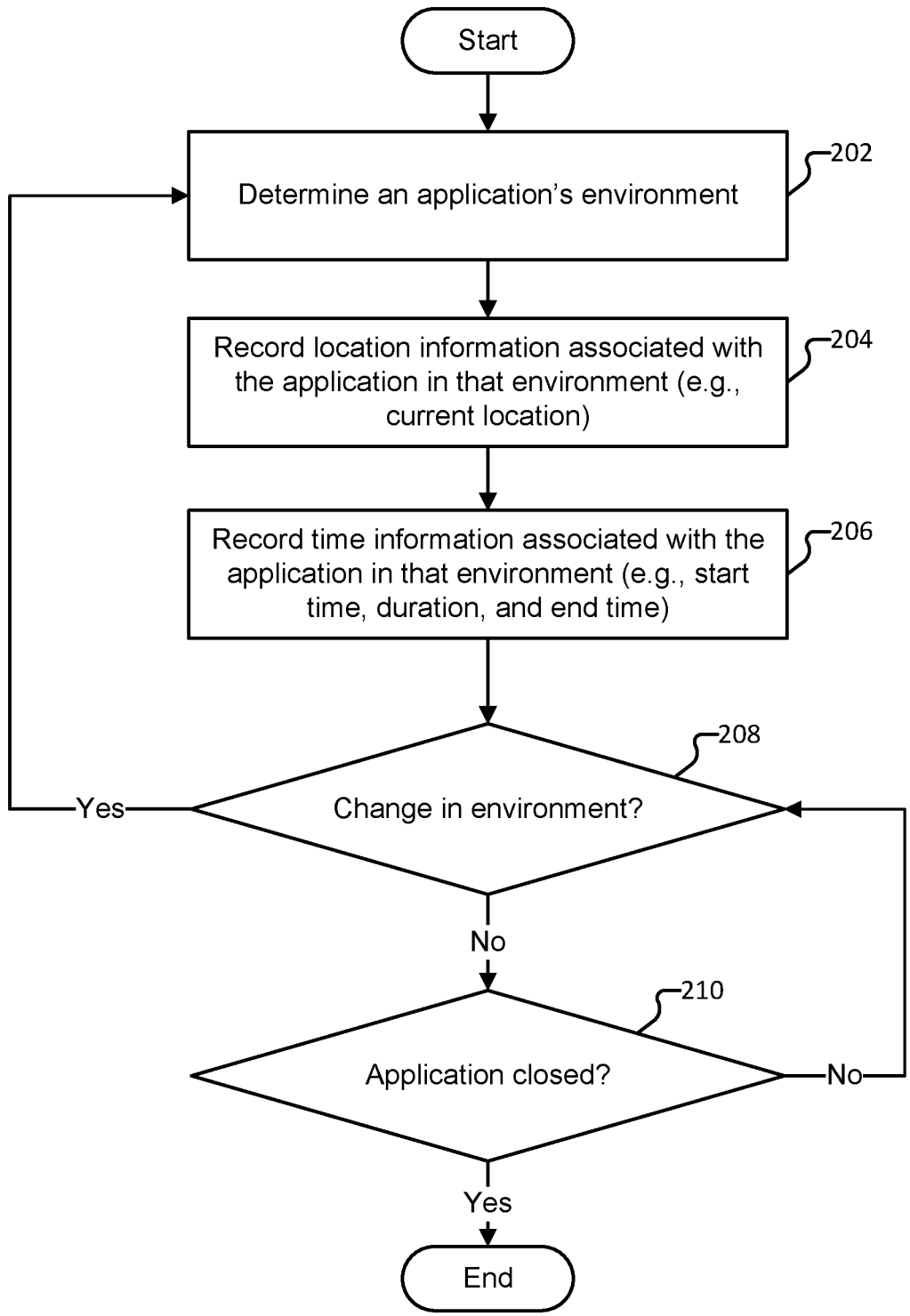
FIG. 2 is a flow chart illustrating an embodiment of a process for collecting user use information associated with an application.

FIG. 2 is a flow chart illustrating an embodiment of a process for collecting user use information associated with an application. In some embodiments, the process of FIG. 2 is implemented in smart device 102 of FIG. 1.

The process of FIG. 2 describes one example process of collecting user use information associated with a particular application. The process of FIG. 2 may be repeated for each different application.

At 202, an application's environment is determined. In various embodiments, the application's environment is either the background environment or the foreground environment. In various embodiments, this determination is made after an application has been launched. The application would not exist in either the foreground or background if it has not been launched or if it has been closed.

At 204, location information associated with the application in its environment is recorded. If the application is running in the foreground, the location information would be recorded in a set of foreground status information for that application. Similarly, if the application is running in the background, the location information would be recorded in a set of background status information for the application. In some embodiments, the location information that is recorded is a current GPS location with a specified precision. A user-defined location, e.g., home, office, and so forth, may also be recorded. In various embodiments, the location information may be recorded periodically. For example, the location information may be recorded every five minutes.

At 206, time information associated with the application in its environment is recorded. If the application is running in the foreground, the time information would be recorded in a set of foreground status information for that application. Similarly, if the application is running in the background, the time information would be recorded in a set of background status information for the application. In various embodiments, the time information that is recorded is a current time, a start time, an end time, and/or a time duration. In the example shown, time information is collected after location information is collected, but the order could be reversed without affecting the information collected. In various embodiments, the time information may be recorded periodically. For example, the time information may be recorded every five minutes.

At 208, it is determined whether there is a change in the application's environment. In the example shown, if at 208 it is determined that a change in environment has occurred, the new environment would be determined at step 202, location information would be recorded again at step 204, and time information would be recorded again at step 206. For example, the application switching from the foreground to the background would be a change in environment. The location (e.g., a GPS current location or a user-defined current location) would be recorded again, but now in the set of background status information for the application instead of the set of foreground status information for the application. Time information would then be recorded again after the location information has been recorded. In this manner, both the set of foreground status information and the set of background status information for the application would be populated with location and time information. From these two sets of information, it would be possible to determine the location and time associated with an application's launch, switching of environment, durations for each foreground and background episode, and closing.

If at 208 it is determined that a change in the application's environment (e.g., foreground to background or background to foreground) has not occurred, it is further determined at 210 whether the application has been closed. In the example shown, if it is determined that the application has been closed, location and time information would no longer be collected until the application has been relaunched. The example shown illustrates collection of location and time information to populate a set of foreground status information and a set of background status information for an application. It would also be possible to specifically record location and time information associated with certain events, e.g., an application's launch or closing and recycling of resources associated with an application. If at 210 it is determined that the application has not been closed, it is again determined at step 208 whether a change in the application's environment has occurred.

Figure 3:
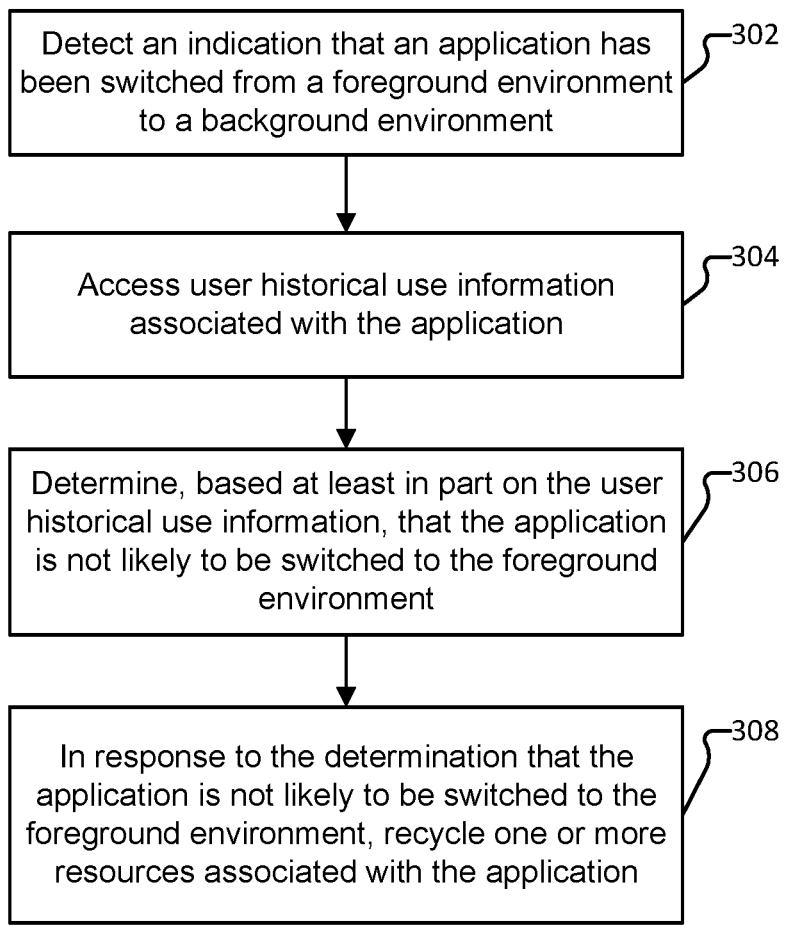
FIG. 3 is a flow chart illustrating an embodiment of a process for managing applications in light of user use habits.

FIG. 3 is a flow chart illustrating an embodiment of a process for managing applications in light of user use habits. In some embodiments, the process of FIG. 3 is implemented in smart device 102 of FIG. 1.

The process of FIG. 3 describes one example process of managing a particular application in light of user habits. The process of FIG. 3 may be repeated for each different application.

At 302, an indication that an application has been switched from a foreground environment to a background environment is detected. In the example shown, the switch detected is from a foreground environment to a background environment, but the reverse could be detected as well. In various embodiments, a smart device detects through monitoring that an application has been switched to the background. In various embodiments, monitoring functional unit 106 of FIG. 1 may monitor the statuses of applications at all times or at certain intervals, e.g., every five minutes. The smart device would record information both when it detects that an application has been launched (to know the application is in the foreground) and when it detects that an application has been switched to the background.

At 304, user historical use information associated with the application is accessed. In various embodiments, the user historical use information will be location and time information with respect to foreground status and background status. The approaches identified below give examples of particular types of information that may be selected from the user historical use information.

At 306, based at least in part on the user historical use information, it is determined that the application is not likely to be switched to the foreground. In some embodiments, when executing step 306, a first approach described below may be employed. In this first approach, a set of foreground status information is selected from the user historical use information for the application. Then, current status information for the application is determined. The current status information for the application may be a current location of a smart device running the application and/or a current time. The particulars depend on what is in the set of foreground status information. Next, a ratio that characterizes the frequency with which the current status appears in the set of foreground status information for the application is calculated. For example, assume that the current location is Location 1. Thus, all locations similar to Location 1 are identified in the set of foreground status information for the application, and a ratio of these similar locations to all the locations in the set of foreground status information is calculated. In this way, the smart device is able to assess whether a user is in a location for which the application is regularly used in the foreground. Finally, the ratio is compared to a threshold, and, based at least in part on the comparison, whether the application will continue to be used or not is determined (i.e., in this example, whether the application is likely to be switched to the foreground). For example, assume that the ratio of locations similar to Location 1 to all locations in the set of foreground status information for the application is 30% and this does not exceed a predetermined threshold of 40%. This means that the current location of the smart device is not within a range of locations where the user regularly uses the application. Therefore, in accordance with step 308 described below, resources utilized by the application would be recycled in this case.

In some embodiments, when executing step 306, another approach described below may be employed. In this second approach, a set of foreground status information and a set of background status information are selected from the user historical use information for the application. Then, current status information for the application is determined. As with the first approach, the current status information for the application may be the current location of the smart device running the application and/or the current time. The particulars depend on what is in the set of foreground status information. Next, a ratio that characterizes the frequency with which the current status appears in the set of foreground status information for the application is calculated, and another ratio that characterizes the frequency with which the current status appears in the set of background status information for the application is also calculated. For example, assume that the current time is Time 1. Thus, all times similar to Time 1 are identified in the set of foreground status information for the application, and a ratio of these similar times to all the times in the set of foreground status information is calculated. Additionally, all times similar to Time 1 are identified in the set of background status information for the application, and a ratio of these similar times to all the times in the set of background status information is also calculated. In this way, the smart device is able to assess whether the user usually uses the application in the foreground at the current time or whether the application is usually switched to the background at the current time.

Finally, a comprehensive status value that is a linear combination of these two ratios (one ratio associated with the application in the foreground and another ratio associated with the application in the background) is created, the comprehensive status value is compared to a threshold, and, based at least in part on the comparison, whether the application will continue to be used or not is determined (i.e., in this example, whether the application is likely to be switched to the foreground). For example, assume that the first ratio of times described above (associated with the set of foreground status information) is 60% and the second ratio of times described above (associated with the set of background status information) is 40%. Assume that the comprehensive status value ends up being computed to be $R=60\%\ a+40\%\ b=45\%$, where a and b are preset weights and the relevant threshold in this particular case is 50%. Because, in this example, the comprehensive status value is less than the threshold of 50%, it is determined that at the current time, the user will probably (e.g., is predicted to) not use the application in the foreground. Therefore, in accordance with step 308 described below, resources utilized by the application would be recycled in this case.

In some embodiments, the threshold value to which the comprehensive status value is compared is preconfigured for each application. For example, the threshold value of 50% in the preceding example may be predetermined. In some embodiments, this threshold value may be determined dynamically. For example, in the event that a smart device's resources become particularly limited, it may be beneficial to dynamically increase a threshold to which a comprehensive status value is compared in order to make it more likely that resources would be recycled. In various embodiments, idle memory is a resource that may become limited.

The construction of a comprehensive status value is general in nature. With the first approach described above, the ratio calculated in the first approach may also be regarded as a comprehensive status value. In some embodiments, comprehensive status values may be constructed according to location information with respect to foreground and/or background status, time information with respect to foreground and/or background status, and/or any combination of the preceding.

At 308, in response to the determination that the application is not likely to be switched to the foreground, one or more resources associated with the application are recycled. Examples of recycling resources associated with an application include overwriting that application's data in memory with data associated with a different application; allocating CPU time associated with that application to a different application; and/or allocating network bandwidth associated with that application to a different application. In various embodiments, recycling resources associated with an application does not require closing the application. Closing an application typically allows all of the resources associated with the application to be reclaimed by an operating system. In various embodiments, recycling resources associated with an application instead of closing the application reduces the time it takes the application to load for a user when the user requests use of the application at a later time. For example, allocating a first application's CPU time to a second application instead of closing the first application may allow for the first application to be loaded more quickly when it is requested again.

Conversely, if the smart device determines that the application will continue to be used, the resources utilized by the application would not be recycled. In some embodiments, the resources would not be recycled even if it is determined that the application satisfies a separate condition for resource recycling. Determining that the application satisfies a condition for resource recycling may mean that a runtime status and/or a system status of the application satisfies a certain condition. Examples of such a condition may include, but are not limited to, any one of the following three situations:

Situation 1: the smart device keeps time after the application switches to the background and determines that the elapsed time has reached a limit. Specifically, in this example, even if the application has been switched to the background for a long time, if it has been determined that the application executing in the background is not likely to be switched to the foreground environment, resources utilized by the application would not be recycled after it is determined that the user may continue to use the application.

Situation 2: the smart device determines that the length of time resources of the application have been utilized has reached a limit. Specifically, in this example, even if the application has been utilizing the resources for a long time, if it has been determined that the application executing in the background is not likely to be switched to the foreground environment, the resources utilized by the application would not be recycled after it is determined that the user may continue to use the application.

Situation 3: the smart device determines that the smart device's idle memory ratio is below a certain threshold. Specifically, in this example, even if the idle memory ratio is too low, if it has been determined that the application executing in the background is not likely to be switched to the foreground environment, the resources utilized by the application would not be recycled after it is determined that the user may continue to use the application. In some embodiments, a smart device may determine that the current idle memory ratio of the smart device is less than a threshold, separately calculate a comprehensive status value for each application in the background, and sequentially recycle resources of the applications according to an order of comprehensive status values until the current idle memory ratio of the smart device is not less than the threshold. Recycling may be done in order from smallest comprehensive status value to largest, or it may be done from largest to smallest, depending on the context and the specific manner in which comprehensive status values are constructed.

Figure 4:
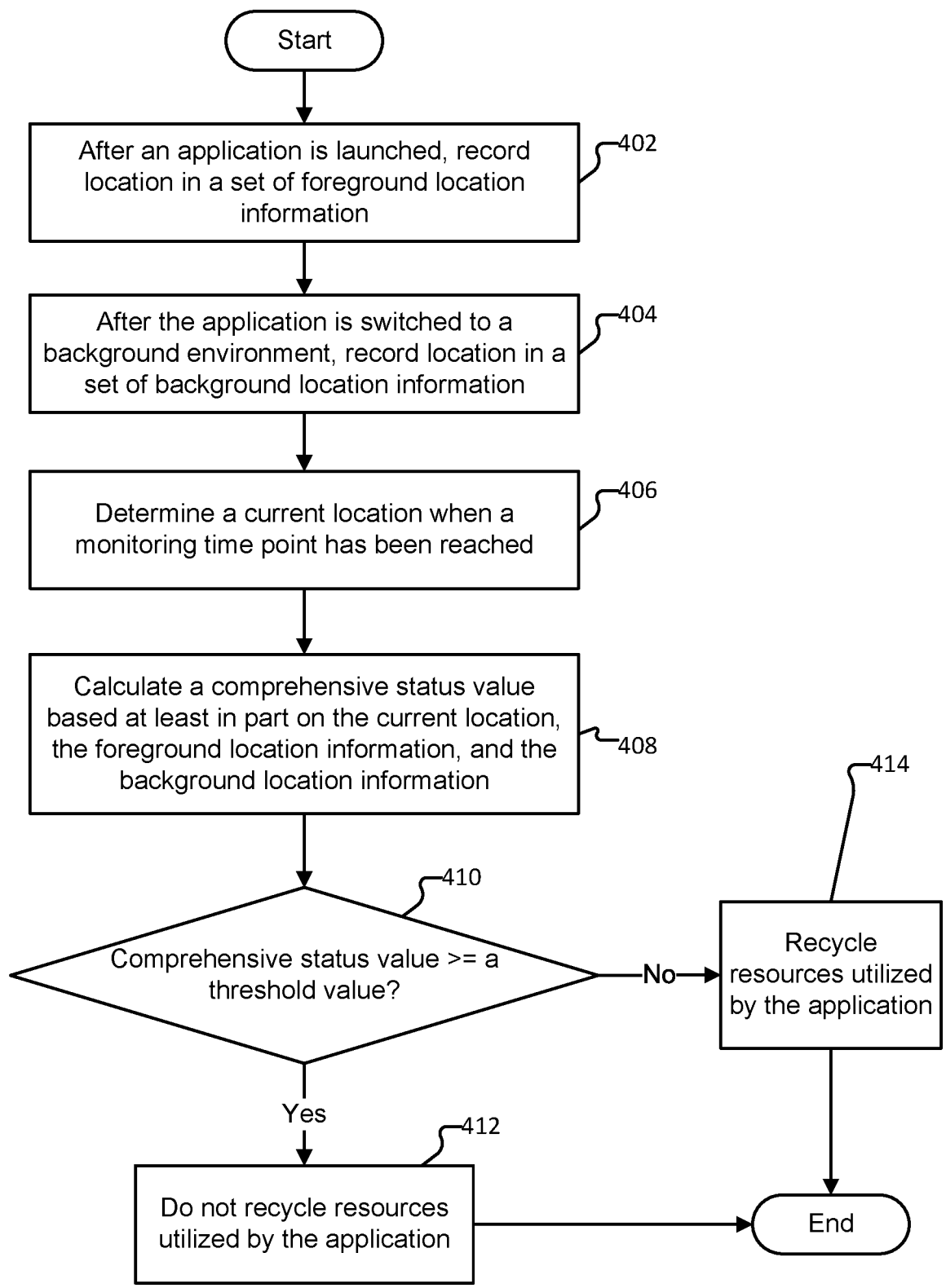
FIG. 4 is a flow chart illustrating an embodiment of a process that calculates a comprehensive status value to assist in the management of applications in light of user use habits.

FIG. 4 is a flow chart illustrating an embodiment of a process that calculates a comprehensive status value to assist in the management of applications in light of user use habits.

It provides a more detailed description of the example shown in FIG. 3. The example of a single application is still used, and it is assumed that what is recorded in both the set of foreground status information and the set of background status information for the application is location information. Time information could also be recorded. For illustrative purposes, the example in FIG. 4 just describes location information. In some embodiments, the process of FIG. 4 is implemented in smart device 102 of FIG. 1.

The process of FIG. 4 shows an example process of determining whether an application that has been switched from the foreground to the background is predicted to be switched back to the foreground based on calculating a comprehensive status value corresponding to the application. As will be described in further detail below, if the comprehensive status value is greater than or equal to a threshold value, then the application is predicted to be switched back to the foreground and therefore its resources will not be recycled. However, if the comprehensive status value is lower than the threshold value, then the application is predicted not to be switched back to the foreground and therefore its resources will be recycled.

At 402, after an application is launched, a first location associated with the launch of the application is recorded in a set of foreground status information (because the application is launched into the foreground) for the application. In some embodiments, precise positioning may not be required. For example, first location information precise to within 100 meters (merely an example) of the smart device may be sufficient. As another example, after the user launches a "video playing" application at home, smart device 102 may record its location as a physical location (e.g., specific physical coordinates, such as those derived from GPS positioning) or as a user-defined location (e.g., "home" in this example).

At 404, after the application is switched to the background, location information associated with the application at the time the application is switched to the background is recorded in a set of background status information for the application. In some embodiments, precise positioning may not be required. For example, this location information precise to within 100 meters (merely an example) of the smart device may be sufficient. As another example, after leaving home and going to a park, and after the user switches the "video playing" application to the background, smart device 102 may record its location as a physical location (e.g., specific physical coordinates, such as those derived from GPS positioning) or as a user-defined location (e.g., "park" in this example).

At 406, after it is determined that a monitoring time point has been reached, current location information is determined again. In some embodiments, whenever an application is switched to the background, a timer is started and a monitoring time point is set, e.g., every five minutes is a monitoring time point. In this example, whenever a monitoring time point is reached, the current location information is acquired. In addition, in this example, the timer would be turned off in the event that the application is switched back to the foreground.

In some embodiments, in the event that an application has been in the background for a specified length of time, the resources associated with the application may be recycled. For example, in the event that a specified number of monitoring time points has been reached after an application has been switched to the background, which indicates that the application has been in the background for a specified length of time, it is possible to recycle the resources associated with the application without calculating a comprehensive status value for the application.

At 408, a comprehensive status value based at least in part on the current location, foreground location information, and background location information is calculated. A ratio that characterizes the frequency with which the current location appears in the set of foreground status information for the application is calculated (ratio A in this example). For example, the calculation may be: A=number of times the current location appears within the set of foreground status information/number of entries in the set of foreground status information. Another ratio that characterizes the frequency with which the current location appears in the set of background status information for the application is also calculated (ratio B in this example). For example, the calculation may be: B=number of times the current location appears within the set of background status information/number of entries in the set of background status information. Additionally, a ratio C that characterizes the frequency with which the current location does not appear in the set of foreground status information for the application may be calculated. For example, the calculation may be: C=number of times the current location does not appear within the set of foreground status information/number of entries in the set of foreground status information. Also, a ratio D that characterizes the frequency with which the current location does not appear in the set of background status information for the application may be calculated. For example, the calculation may be: D=number of times the current location does not appear within the set of background status information/number of entries in the set of background status information. An example of a formula that may be used to calculate a comprehensive status value is the following: comprehensive status value $R = A \times a + B \times b + C \times c + D \times d$ (Formula 1). Furthermore, a, b, c, and d are typically preset weights. R is the comprehensive status value for the application. In some embodiments, the above formula may be transformed into: $R = A \times a + C \times c$ (Formula 2). Formulas 1 and 2 are presented as illustrative and not restrictive examples.

At 410, it is determined whether the comprehensive status value is greater than or equal to a threshold. In the example shown, if at 410 it is determined that the comprehensive status value is greater than or equal to the threshold, then at 412, resources utilized by the application would not be recycled because it is determined that the application will continue to be used.

If at 410 it is determined that the comprehensive status value is less than the threshold, then at 414, resources utilized by the application would be recycled because it is determined that the application will not continue to be used. In the example described above, Formula 1 is used to evaluate the application in the sense that a comprehensive status value may be obtained in light of user use habits. In this example, assume that the user regularly uses a certain application (e.g., "application X") in a certain context (e.g., "context A") and regularly switches application X to the background in another context (e.g., "context B"). Whenever there is similarity with context A (e.g., the current location is similar to context A), it would be determined that context A appears at a high rate in the set of foreground status information for application X and at a low rate in the set of background status information for application X, meaning the comprehensive status value R calculated using Formula 1 would be high (and likely exceed the threshold) and resources utilized by application X would generally not be recycled. Correspondingly, whenever there is conformance with context B (e.g., the current location conforms with context B), it would be determined that context B appears at a low rate in the set of foreground status information for application X and at a high rate in the set of background status information for application X, meaning the comprehensive status value R calculated using Formula 1 would be low (and likely not exceed the threshold) and resources utilized by application X would generally be recycled.

The following scenario provides a further example and description of the process illustrated in FIG. 4. In this scenario, assume a user frequently uses an application called "order a meal" between 12:00 pm and 1:30 pm and "order a meal" is usually in the background during other time periods. Whenever the user opens "order a meal" between 12:00 pm and 1:30 pm, foreground status time information for "order a meal" could be recorded as "12:00 pm to 1:30 pm." Whenever the user switches "order a meal" to the background, background status time information for "order a meal" could be recorded as "other time." In this example, assume that the user historical use information contains the following information: on eight occasions, the user opened "order a meal" between 12:00 pm and 1:30 pm and switched "order a meal" to the background at "other time" and on two occasions opened "order a meal" at "other time" and switched "order a meal" to the background between 12:00 pm and 1:30 pm. Assume that it is detected that the user has switched "order a meal" to the background and that the current time is 4:00 pm, which is classed as "other time." In this situation, a ratio A that corresponds to the frequency with which the current status of 4:00 pm occurs in the set of foreground status information for "order a meal" is calculated as 20%, and a ratio B that corresponds to the frequency with which the current status of 4:00 pm occurs in the set of background status information for "order a meal" is calculated as 80%. In this example, assume Formula 1 with some set of weights (e.g., comprehensive status value $R=A \times 2+B \times 1.8+C \times 1.6+D \times 1.5$) is used, and further assume that the result is $R=1.5$ and the relevant threshold is 2. In this scenario, it would be determined that the resources utilized by "order a meal" should be recycled.

In some embodiments, when user historical use information containing foreground status information and background status information for an application (e.g., application X described above) is used, historical information corresponding to periods of time associated with the current time may also be needed. For example, if the current time is during a non-work day, user historical use information recorded on non-work days may be selected. If the current time is during a work day, user historical use information recorded on work days may be selected. In some embodiments, in making the determination as to whether to recycle resources utilized by an application (e.g., application X described above), other factors may be considered. For example, the number of times a timer has been triggered, which can be used as a measure of the length of time since an application was switched to the background, may be considered. How long an application has utilized resources and/or a smart device's idle memory ratio may also be considered. Taking application X as an example, assume that, using Formula 1, R for application X is greater than or equal to the threshold. In this example, this means that it is likely at this point that application X will be used in the foreground again. Thus, even if any of the following situations or a combination of the following situations occurs, it might not be beneficial to recycle resources utilized by application X given that it is predicted that application X will be used in the foreground again. Situation 1: the length of time since the application was switched to the background has reached a certain limit, e.g., the number of times a timer has been triggered has reached a certain limit. Situation 2: the length of time that the application's resources have been utilized has reached a certain limit. Situation 3: a smart device's idle memory ratio is lower than a certain threshold.

Figure 5:
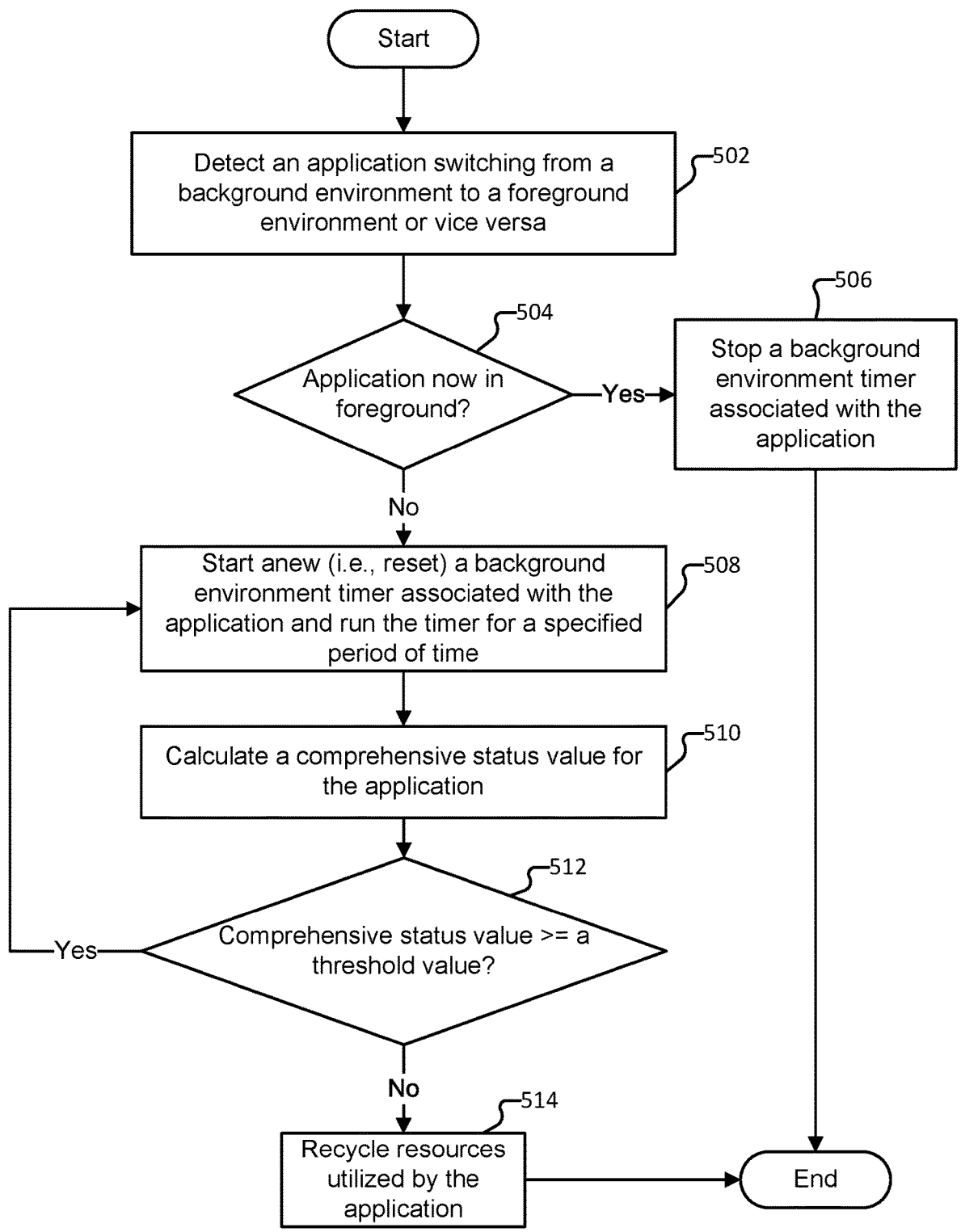
FIG. 5 is a flow chart illustrating an embodiment of a process for managing applications in light of user use habits while incorporating a background environment timer.

FIG. 5 is a flow chart illustrating an embodiment of a process for managing applications in light of user use habits while incorporating a background environment timer. In some embodiments, the process of FIG. 5 is implemented in smart device 102 of FIG. 1.

The process of FIG. 5 shows an example process of determining whether an application that has been switched from the foreground to the background is a candidate application for which resources are to be recycled by virtue of the application having been in the background for at least a specified period of time.

At 502, an application switching to a different environment is detected. In various embodiments, the switch is either from a background environment to a foreground environment or from a foreground environment to a background environment.

At 504, it is determined whether the application is now in the foreground. If at 504 it is determined that the application is now in the foreground, then at 506, a background environment timer associated with the application is stopped. If the application is now in the foreground, this means the application switched from the background to the foreground. This means that a timer that is recording how long the application has been in the background can now be stopped because the application is now in the foreground.

If at 504 it is determined that the application is not now in the foreground (i.e., it is in the background), then at 508, a background environment timer associated with the application is started (restarted if it had been running before) and allowed to run for a specified period of time.

At 510, a comprehensive status value for the application is calculated. Examples of ways to calculate the comprehensive status value include using Formula 1 (as described above), using Formula 2 (as described above), and using a different formula that may or may not be a variation of Formula 1 and Formula 2.

At 512, it is determined whether the comprehensive status value is greater than or equal to a threshold value. If at 512 it is determined that the comprehensive status value is greater than or equal to the threshold value, then step 508 is repeated. This is because at this point the background environment timer has run for the specified period of time (e.g., a cycle) and the comprehensive status value has not dropped below the threshold value, which means the application is still likely to be switched to the foreground and a new cycle for the background environment timer should be started. As such, the process of FIG. 5 shows that an application in the background can be evaluated multiple times for whether its resources should be recycled.

If at 512 it is determined that the comprehensive status value is less than the threshold value, then at 514, resources utilized by the application are recycled.

The following scenario provides a further example and description of the process illustrated in FIG. 5. In this scenario, assume a user regularly uses an application called "online game." In addition, whenever the user leaves home, the user switches "online game" to the background. Therefore, whenever the user launches "online game" at home, the foreground status recorded for "online game" would be "home." In this example, when the user leaves home and switches "online game" to the background, the background status recorded for "online game" might be "away from home." In this example, assume that the user has on nine occasions started "online game" while at home and switched "online game" to the background when leaving home. Also assume that it is detected that the user is now switching "online game" to the background (after having launched it while not at home) and that the current location is "home." In this situation, a ratio A that corresponds to the frequency with which the current status of "home" occurs in the set of foreground status information for the application is calculated as 90%, and a ratio B that corresponds to the frequency with which the current status of "home" occurs in the set of background status information for the application is calculated as 10%. In this example, assume Formula 1 with some set of weights (e.g., comprehensive status value $R=A \times 2+B \times 1.8+C \times 1.6+D \times 1.5$) is used, and further assume that the result is R=5 and the relevant threshold is 2. In this scenario, it would be determined that there is no need to recycle the resources utilized by "online game." In this scenario, the decision to not recycle the resources utilized by "online game" is in line with the user's use habits. After "online game" is switched to the background, the resources allocated to "online game" are retained so that the user will be able to call up "online game" again at any time, ensuring a proper user experience. In this example, assume that after an hour or two, the user has not closed "online game" and a background environment timer has run through multiple cycles, meaning the comprehensive status value of "online game" has been calculated multiple times. As time progresses, the comprehensive status value for "online game" would progressively decrease. In various embodiments, when the comprehensive status value falls below a threshold (e.g., 0.5), resources utilized by "online game" may be recycled or "online game" may be closed. In this example, if the user has not used "online game" for a long period of time, resources utilized by "online game" would be recycled in order to ensure the availability of resources for other opened applications or to-be opened applications.

In some embodiments, resources associated with an application may be recycled in the event a background environment timer is run for the application a specified number of cycles. The "online game" example above illustrates an embodiment where a background environment timer has run through multiple cycles and the comprehensive status value for "online game" progressively decreases, eventually resulting in the resources associated with "online game" being recycled due to the comprehensive status value of "online game" falling below a threshold. It is also possible to recycle the resources associated with an application (e.g., "online game") based on the number of cycles the application has run through (e.g., recycle the resources after a specified number of cycles has occurred) without considering the comprehensive status value of the application.

In some embodiments, when a smart device's idle memory ratio is less than or equal to a certain threshold (e.g., 20%), even if there is no comprehensive status value for any application below the relevant threshold for applications, the system might still force resource recycling to ensure system performance. In some embodiments, the comprehensive status values for all applications in the background may be ranked and applications may have their resources recycled in order from the application with the lowest comprehensive status value to the highest until the smart device's idle memory ratio is above a certain threshold (e.g., 20%). This process is shown in FIG. 6 and further described below.

Figure 6:
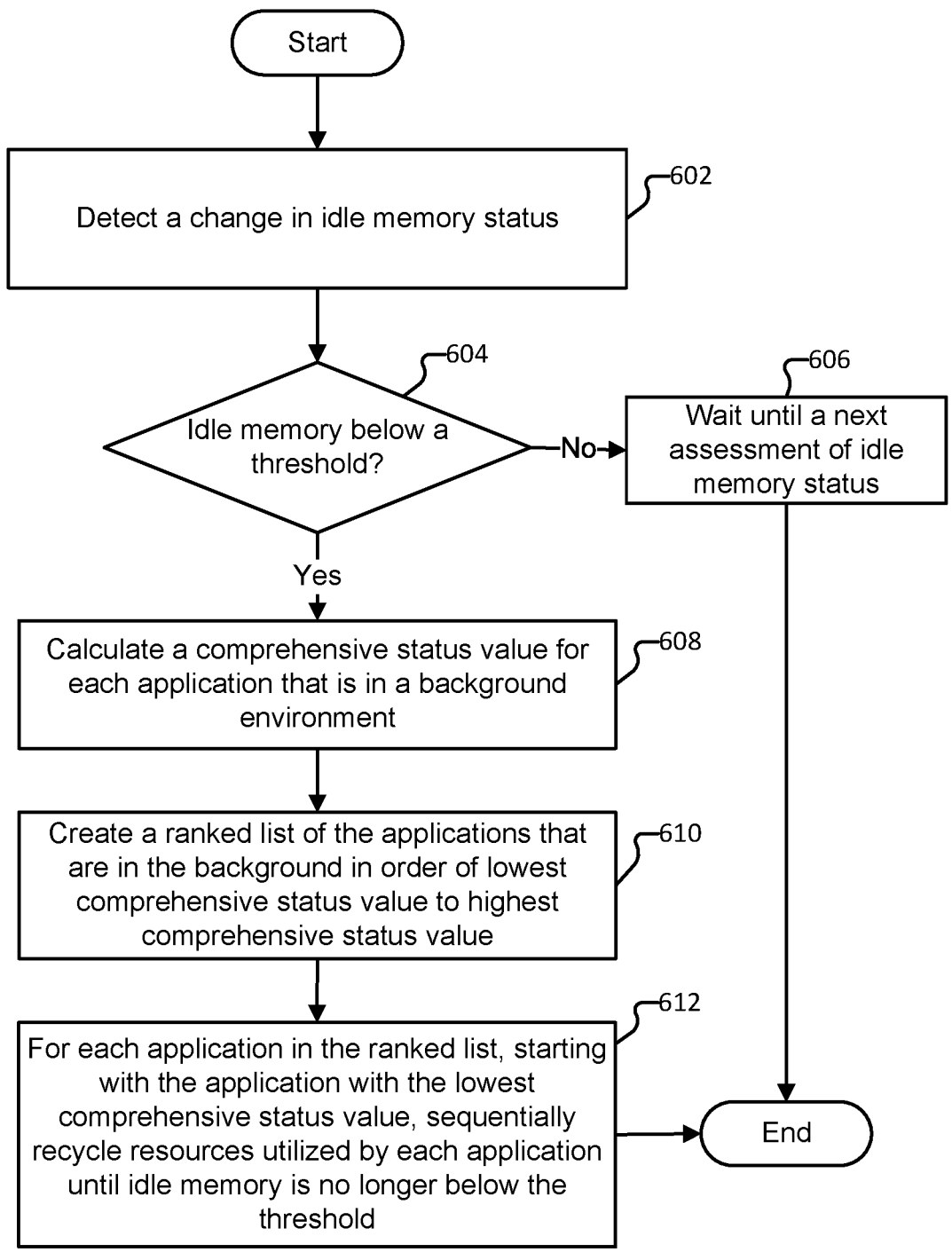
FIG. 6 is a flow chart illustrating an embodiment of a process for managing applications in light of user use habits while incorporating a mechanism to ensure system performance.

FIG. 6 is a flow chart illustrating an embodiment of a process for managing applications in light of user use habits while incorporating a mechanism to ensure system performance. In some embodiments, the process of FIG. 6 is implemented in smart device 102 of FIG. 1.

The process of FIG. 6 shows an example process of triggering the recycling of resources associated with one or more applications in the background in response to a detected idle memory status of a smart device being below a threshold.

At 602, a change in idle memory status is detected.

At 604, it is determined whether idle memory is below a threshold (e.g., 20%). If it is determined that idle memory is not below the threshold, then at 606, it is determined that nothing should be done until a next assessment of idle memory status (e.g., wait until the next time a change in idle memory status is detected).

If at 604 it is determined that idle memory is below a threshold, then at 608, a comprehensive status value is calculated for each application in the background.

At 610, a ranked list of the applications that are in the background in order of lowest comprehensive status value to highest comprehensive status value is created.

At 612, starting with the application whose comprehensive status value is the lowest, resources utilized by each application are sequentially recycled until idle memory is no longer below the threshold (e.g., 20%). For example, Application A, Application B, and Application C are running in the background of a smart device. The idle memory of the smart device is detected to be 15% (less than the example threshold of 20%). The respective comprehensive status value is determined for each of Applications A, B, and C. In this example, Application C has the highest corresponding comprehensive status value, Application B has the second highest, and Application A has the lowest. Therefore, Application A's resources are recycled. Then the idle memory is computed and determined to be 18%, which is still lower than the threshold. Next, Application B's resources are recycled. Then the idle memory is computed and determined to be 22%, at which point, Application C's resources are not recycled until another condition is met (e.g., Application C's comprehensive status value is less than a threshold associated with Application C).

A person skilled in the art should understand that embodiments of the present application can be provided as techniques, systems, or computer program products. Therefore, the present application may take the form of completely hardware embodiments, completely software embodiments, or embodiments that combine software and hardware. Moreover, the present application may take the form of computer program products implemented on one or more computer-operable storage media (including but not limited to magnetic disk storage, CD-ROMs, and optical storage) containing computer-operable program code.

The present application is described with reference to flow charts and/or block diagrams based on techniques, devices (systems), and computer program products of the embodiments of the present application. Please note that each flow process and/or block within the flow charts and/or block diagrams and combinations of flow processes and/or blocks within the flow charts and/or block diagrams can be implemented by computer program instructions. These computer program instructions can be provided to the processors of general-purpose computers, specialized computers, embedded processor devices, or other programmable data-processing devices to produce a machine. The instructions executed by the processors of the computers or other programmable data-processing devices consequently give rise to means for implementing the functions specified in one or more processes in the flow charts and/or one or more blocks in the block diagrams.

These computer program instructions can also be stored in computer-readable memory that can guide computers or other programmable data-processing devices to operate according to specific modes, with the result that the instructions stored in this computer-readable memory give rise to products that include command means. These command means implement the functions specified in one or more processes in a flow chart and/or one or more blocks in a block diagram.

These computer program instructions can also be loaded onto a computer or other programmable data-processing device, with the result that a series of operating steps are executed on a computer or other programmable device so as to give rise to computer processing. In this way, the instructions executed on a computer or other programmable device provide steps for implementing the functions specified by one or more processes in a flow chart and/or one or more blocks in a block diagram.

Although several embodiments of the present application have already been described, persons skilled in the art can make other modifications or revisions to these embodiments once they grasp the basic creative concept. Therefore, the attached claims are to be interpreted as including the embodiments described herein as well as all modifications and revisions falling within the scope of the embodiments of the present application.

A person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
      determine that an application is running in a foreground environment of a mobile device;
      detect an indication that the application has been switched from the foreground environment to a background environment;
      in response to detecting the indication that the application has been switched from the foreground environment to the background environment, record a time and a physical location of the mobile terminal corresponding to when the application was switched to the background environment, the time and the physical location being recorded in user historical information;
      determine a current status information of the mobile device, wherein the current status information comprises a current physical location associated with the mobile device, and a current time;
      determine a metric associated with the current status information based at least in part on user historical use information associated with the application and the current status information, wherein:
         the metric is determined based at least in part on a ratio associated with the current physical location, wherein:
            the ratio includes a numerator portion comprising a count of instances of the current physical location in a group of instances of physical locations associated with the application being in the foreground environment, and
            the ratio includes a denominator portion comprising a count of instances of physical locations in the group of instances of physical locations associated with the application being in the foreground environment;
      determine, based at least in part on the metric associated with the current status information of the mobile device, that the application is not likely to be switched to the foreground environment; and
      in response to the determination that the application is not likely to be switched to the foreground environment, recycle one or more resources associated with the application, wherein:
         to recycle the one or more resources associated with the application comprises reallocating data memory or processing resources used by the application; and
         the data memory or processing resources are reallocated without closing the application.

2. The system of claim 1, wherein to determine the metric associated with the current status information based at least in part on the user historical use information, the memory is further configured to provide the processor with instructions which when executed cause the processor to:
   determine whether the application is in the foreground environment or the background environment; and
   record the current status information in a set of foreground status information associated with the application in the event that the application is in the foreground environment or in a set of background status information associated with the application in the event that the application is in the background environment.

3. The system of claim 2, wherein the current status information further includes the current time.

4. The system of claim 2, wherein the set of foreground status information is subdivided into subsets.

5. The system of claim 2, wherein the set of background status information is subdivided into subsets.

6. The system of claim 1, wherein to determine, based at least in part on the metric associated with the current status information of the mobile device, that the application is not likely to be switched to the foreground environment, the memory is further configured to provide the processor with instructions which when executed cause the processor to:
   determine a status value associated with a likelihood that the application will be switched to the foreground environment;
   compare the status value with a threshold value; and
   based at least in part on the comparison with the threshold value, determine that the application is not likely to be switched to the foreground environment.

7. The system of claim 6, wherein the status value is determined based at least in part on a set of foreground status information associated with the application.

8. The system of claim 6, wherein the status value is determined based at least in part on a set of background status information associated with the application.

9. The system of claim 6, wherein the status value is updated periodically and compared periodically with the threshold value.

10. The system of claim 9, wherein a background environment timer sets the periodicity with which the status value is updated and compared with the threshold value.

11. The system of claim 10, wherein the resources associated with the application are recycled in the event the background environment timer is run for the application a specified number of cycles.

12. The system of claim 6, wherein the threshold value has been preconfigured.

13. The system of claim 6, wherein the threshold value has been determined dynamically.

14. The system of claim 1, wherein recycling resources associated with the application comprises allocating CPU time associated with the application to a different application.

15. The system of claim 1, wherein recycling resources associated with the application comprises releasing memory associated with the application.

16. The system of claim 1, wherein the memory is further configured to provide the processor with instructions which when executed cause the processor to recycle resources associated with the application if the application has been in the background environment for a specified length of time.

17. The system of claim 1, wherein the memory is further configured to provide the processor with instructions which when executed cause the processor to:
determine that idle memory is below a threshold;
determine a status value for each background application characterizing that background application's likelihood that it will be switched to the foreground environment; and
recycle resources utilized by each background application until the idle memory is no longer below the idle memory threshold.

18. A method, comprising:
determining that an application is running in a foreground environment of a mobile device;
detecting an indication that the application has been switched from the foreground environment to a background environment;
in response to detecting the indication that the application has been switched from the foreground environment to the background environment, record a time and a physical location of the mobile terminal corresponding to when the application was switched to the background environment, the time and the physical location being recorded in user historical information;
determining a current status information of the mobile device, wherein the current status information comprises a current physical location associated with the mobile device, and a current time;
determining a metric associated with the current status information based at least in part on user historical use information associated with the application and the current status information, wherein:
the metric is determined based at least in part on a ratio associated with the current physical location, wherein:
the ratio includes a numerator portion comprising a count of instances of the current physical location in a group of instances of physical locations associated with the application being in the foreground environment, and
the ratio includes a denominator portion comprising a count of instances of physical locations in the group of instances of physical locations associated with the application being in the foreground environment;
determining, based at least in part on the metric associated with the current status information of the mobile device, that the application is not likely to be switched to the foreground environment; and
in response to the determination that the application is not likely to be switched to the foreground environment, recycling one or more resources associated with the application, wherein:
to recycle the one or more resources associated with the application comprises reallocating data memory or processing resources used by the application; and
the data memory or processing resources are reallocated without closing the application.

19. A computer program product, the computer program product being embodied in a non-transitory storage medium and comprising computer instructions for:
determining that an application is running in a foreground environment of a mobile device;
detecting an indication that the application has been switched from the foreground environment to a background environment;
in response to detecting the indication that the application has been switched from the foreground environment to the background environment, record a time and a physical location of the mobile terminal corresponding to when the application was switched to the background environment, the time and the physical location being recorded in user historical information;
determining a current status information of the mobile device, wherein the current status information comprises a current physical location associated with the mobile device, and a current time;
determining a metric associated with the current status information based at least in part on user historical use information associated with the application and the current status information, wherein:
the metric is determined based at least in part on a ratio associated with the current physical location, wherein:
the ratio includes a numerator portion comprising a count of instances of the current physical location in a group of instances of physical locations associated with the application being in the foreground environment, and
the ratio includes a denominator portion comprising a count of instances of physical locations in the group of instances of physical locations associated with the application being in the foreground environment;
determining, based at least in part on the metric associated with the current status information of the mobile device, that the application is not likely to be switched to the foreground environment; and
in response to the determination that the application is not likely to be switched to the foreground environment, recycling one or more resources associated with the application, wherein:
to recycle the one or more resources associated with the application comprises reallocating data memory or processing resources used by the application; and the data memory or processing resources are reallocated without closing the application.

* * * * *